United States Patent [19]

Bubic

[11] Patent Number: 5,080,000

[45] Date of Patent: Jan. 14, 1992

[54] FLEXIBLE ROBOTIC LINKS AND MANIPULATOR TRUNKS MADE THEREFORM

[76] Inventor: Frank R. Bubic, 5140 McDonald Avenue, Suite 1602, Montreal (Quebec), Canada, H3X 3Z1

[21] Appl. No.: 522,143

[22] Filed: May 11, 1990

[51] Int. Cl.[5] ............................................. F01B 19/00
[52] U.S. Cl. ................................... 92/92; 92/48; 91/170 R; 901/22
[58] Field of Search ............... 91/170 R, 183; 92/48, 92/92; 901/22, 337

[56] References Cited

U.S. PATENT DOCUMENTS

| | | | |
|---|---|---|---|
| 4,733,603 | 3/1988 | Kukolj | 92/92 |
| 4,776,852 | 10/1988 | Rubic | 92/44 X |
| 4,792,173 | 12/1988 | Wilson | 92/92 X |
| 4,794,912 | 1/1989 | Lia | 92/92 X |

FOREIGN PATENT DOCUMENTS

| | | | |
|---|---|---|---|
| 7702387 | 9/1978 | France | 901/22 |
| 0837845 | 6/1981 | U.S.S.R. | 901/22 |

*Primary Examiner*—Allen M. Ostrager
*Attorney, Agent, or Firm*—Robic

[57] ABSTRACT

Single or multiple flexible robotic manipulator trunks can be made from individually activated, three degree-of-freedom, flexible robotic links. Three dimensional positioning and orientation of the distal end of each link is achieved exclusively by elastic deformation of the flexible link assembly without revolute or prismatic joints. The activating bending and torsional moments required for such a positioning are generated by the antagonistic action of a plurality of prestressed, inflatable, laterally bendable and axially extensible tubular actuators with the anisotropic, circumferentially reinforced walls. The positioning motion, working forces and manipulator arm stiffness are all controlled by asynchronously modulated pulse streams which regulate the distribution of energy from a common source of fluid under constant pressure.

38 Claims, 7 Drawing Sheets

FLEXIBLE ROBOTIC LINKS AND MANIPULATOR TRUNKS MADE THEREFORM

BACKGROUND OF THE INVENTION a) Field of the Invention

The present invention is generally concerned with robotic manipulators and is more particularly directed to a new type of a truly flexible, three degree-of-freedom robotic link which incorporates a plurality of actuators and can be assembled by means of fixed structural joints to other similar links to form a variety of single or multiple robotic trunk(s).

b) Brief Description of the Prior Art

Most of the robotic arms and prostheses presently available make use of rigid links and revolute joints inspired by evolutionary responses observed in the appendicular musculature of tetrapods. There are, however, many robotic tasks which could be handled in a much better way with robotic arms that would be able to move along appropriate smooth space curves to contour obstacles and approach targets with their end-effectors. Such arms can currently be made only in the form of kinematic chains of a multitude of short, articulated rigid links. Such conventional designs require a large number of mechanical parts, which makes the construction of multiple-orientation manipulators relatively costly and heavy, even for manipulators having only two degrees-of-freedom (2 D.O.F.). Therefore, it is highly impractical not to say impossible to devise a chain of individually articulated and motorized, 3 D.O.F., short rigid links capable of mimicking the kinematics of a living trunk using conventional mechanical hardware to do so. Furthermore, the emulation of lifelike dynamics and the mechanical aspects of neuromuscular controls, which both would be very desirable and often essential in many potential robotic applications, are not among the inherent operating features of any conventional electromechanical or fluid power robotic actuator.

Therefore, there is a need for an improved, inexpensive, multiple-orientation robotic trunk or manipulator made from 3 D.O.F. flexible links possessing, inherently, the same lifelike mechanical properties as can be found in the long trunks and neck of living vertebrates such as, for example, fishes and reptiles. Indeed, a self-contained, artificial musculoskeletal trunk or manipulator having such mechanical properties would offer a mechanical solution for a variety of morphologically simple and effective modes of locomotion, such as exhibited by the limbless reptiles, in both aquatic and terrestrial environments.

OBJECTS OF THE INVENTION

A primary object of the present invention is to provide a new type of truly flexible, 3 D.O.F. robotic link that can be easily assembled to other similar links to form an artificial musculoskeletal trunk movable in any direction exclusively as a result of its own elastic deformation, each link having a 3 D.O.F artificial actuating musculature structurally connected to an artificial spine. Because it does not suffer from the static and dynamic friction encountered in all moving parts of any standard machinery, this new type of robotic link capable of kinematics-by-elastic-deformation ensures a predictable motion for any magnitude of an unbalanced actuating force. Since the strain distribution among all the elastic spinal discs of the spire of such a link reflects the corresponding distribution of actuating stresses with an absolute accuracy, smooth link curves and subtle positioning movements become feasible without erratic breakaway responses.

Another object of the invention is to provide a robotic link whose manufacturing cost is reduced by the elimination of all the conventional types of mechanical moving parts normally used for hinging the link elements and serving the joints of the conventional links. In accordance with the invention, this is achieved by the exclusive use of structurally integrated, elastomeric moulded components, whose functions do not require stringent manufacturing tolerances as is called for in conventional machine assemblies.

A further object of the invention is to provide a new type of robotic link capable of being bent and twisted by means of structurally simple flexible yet contractile, biorobotic actuators. By biorobotic actuators, there is meant all kinds of actuators whose inherent properties are similar to the biomechanical properties of live muscles, including series or series-elastic elements; parallel or parallel-elastic elements; viscous-dissipative elements and contractile elements; an ability of variable stiffness and analogous force-stiffness-length-velocity relationships. In this way, the operating characteristics of the flexible biorobotic link can be built up in such a manner as to conform with natural lifelike dynamics.

Still another object of the invention is to provide a new type of robotic link which emulates the basic mechanical aspects of any living neuromuscular force control, whereby real muscle force development is controlled by progressive recruitment of muscle motor units combined with a proper variation of asynchronous frequencies of some stimulating pulse streams. This mechanically simple control system offers a remarkable precision and a wide range of the force control. The actuators used in the robotic link according to the invention are all powered from a common source of fluid under constant pressure; however, the working pressure of every actuator is individually controlled by a progressive recruitment of pulsating relief valves combined with a variation of asynchronous frequencies of valve controlled pulse streams.

SUMMARY OF THE INVENTION

In accordance with the invention, the above and other objects are achieved with a robotic link as claimed hereinafter, comprising:

- an artificial spine having a longitudinal axis, a proximal end and a distal end, this spine being capable of being laterally bent through elastic deformation and twisted about its longitudinal axis through elastic torsional deformation;
- a pair of end plates attached to the proximal and distal ends of the spine, respectively; and
- a set of axially extensible and contractible actuators connected to the spine or the end plates in such a manner as to bend and twist the spine in any direction when properly actuated.

If desired, each of the actuators may be laterally bendable through elastic deformation to follow any bending or twisting motion of the spine.

The end plates at both ends of the link can be designed for connection to other similar link(s) to form a sequential link assembly, or to two or more branch links when necessary. Such branch link assembly may consist of separate flexible robotic arms, each carrying its own end-effector. Alternatively, these arms can be suitably scaled down and used as the multidirectional fingers of an end-effector.

In accordance with a preferred embodiment of the invention, the actuators are supplied with a flow of fluid under pressure and the fluid pressure is varied as a function of the flow rate by means of an automatic pressure-flow regulator comprising:

- a regulator body having an internal flow restriction aperture;
- a spring-loaded throttling needle extending within the aperture and shaped to increase the flow aperture as the flow rate increases;
- the needle being slidably mounted within a fluid-filled needle spring housing provided with a spring tension take-up screw and with a small throttling needle vibration damper orifice.

BRIEF DESCRIPTION OF THE DRAWINGS

The invention and its numerous advantages will be better understood upon reading of the following nonrestrictive description of some preferred embodiments thereof made with reference to the accompanying drawings.

DESCRIPTION OF SOME PREFERRED EMBODIMENTS OF THE INVENTION

Figure 1:
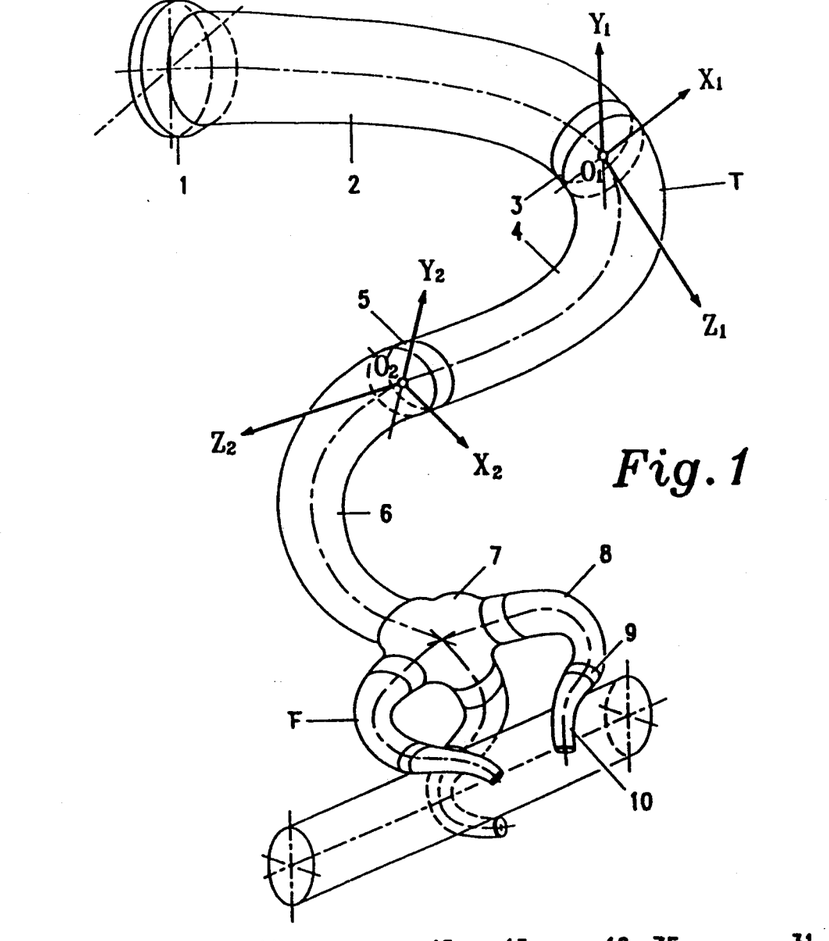
FIG. 1 is a pictorial perspective view of a flexible three-link robotic trunk according to the invention, provided with an end-effector consisting of three smaller two-link chains.

The invention basically provides flexible links like the one numbered 4 in FIG. 1, which, within a given operating range, can three-dimensionally position and orient at will the coordinate frame, $X_2$, $Y_2$, $Z_2$, of one of its ends $O_2$, hereinafter called its distal end, with respect to the coordinate frame $X_1$, $Y_1$, $Z_1$ of its other end $O_1$, hereinafter called proximal end. A number of such flexible links can be joined into a kinematic chain to form a primary robotic trunk "T" by means of intermediary joints such as those identified by reference numerals 3 and 5. The primary flexible robotic trunk "T" can in turn be attached by means of a main joint 1, to an appropriate fixed or mobile base structure (not shown).

A multiple joint 7 can be fixed at the opposite free end of the robotic trunk "T" and support several flexible links like those numbered 8 and 10, connected by joints 9. These secondary trunks can be equipped with individual end-effectors or, when properly scaled for a desired application, be used as flexible fingers "F" to form together a single end-effector.

Figure 8:
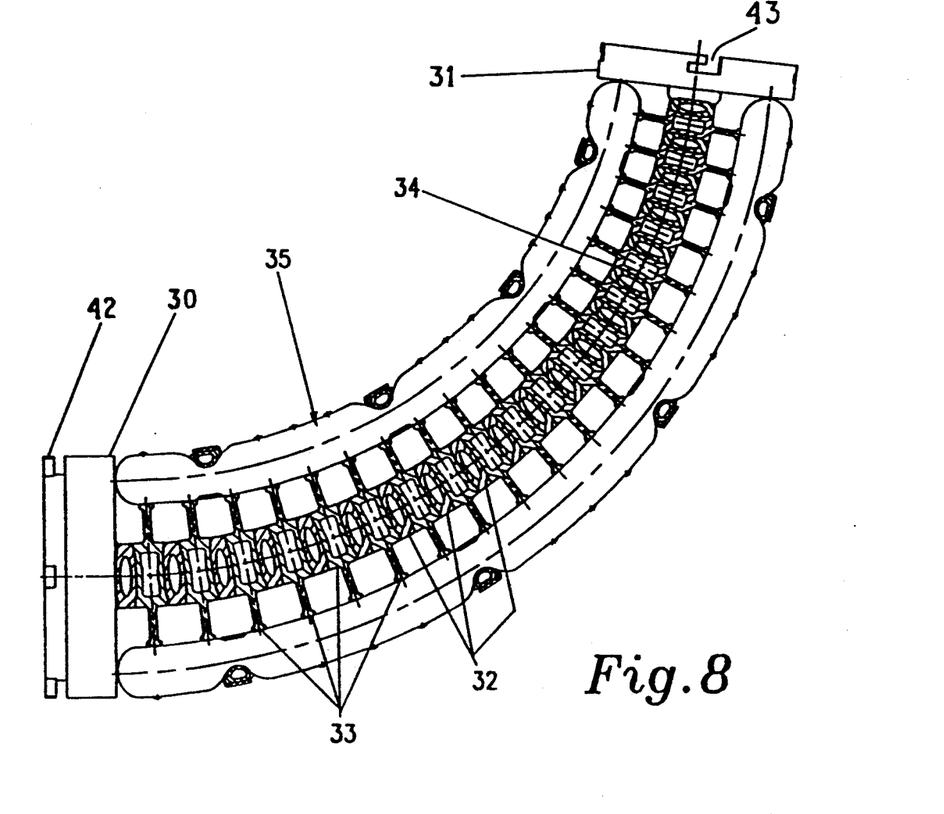
FIG. 8 is a longitudinal cross-sectional view of a flexible link according to the invention, provided with an artificial spine of a fixed length.

As shown in FIG. 8 each flexible link according to the invention basically comprises an artificial spine 34 that can be laterally bent through elastic deformation and can be twisted about its longitudinal axis through elastic torsional deformation. Each link also comprises an actuating framework 35 mounted around the spine 34.

The spine 34 consists of a spinal column made from elastic discs 32 and rigid, artificial vertebrae 33 alternately stacked and firmly bonded to each other.

Figure 2:
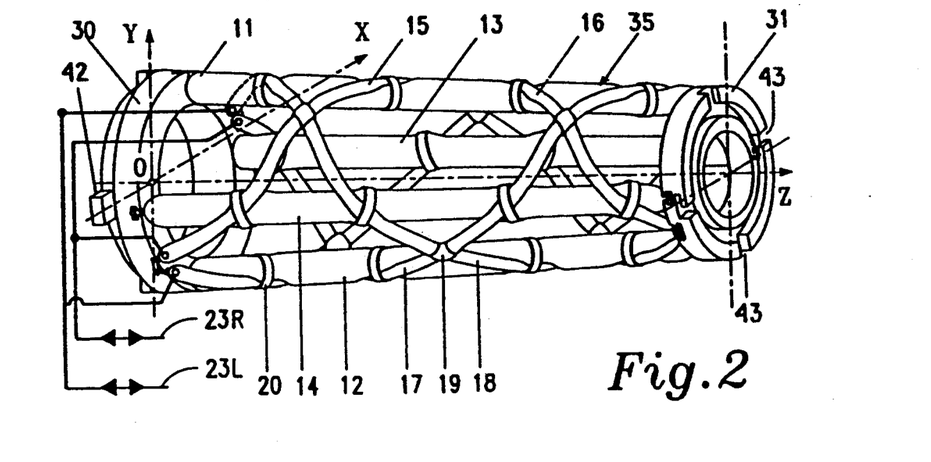
FIG. 2 is a perspective view of a flexible link actuating framework according to the invention, made up from four pairs of continuous contractible actuators.
Figure 5:
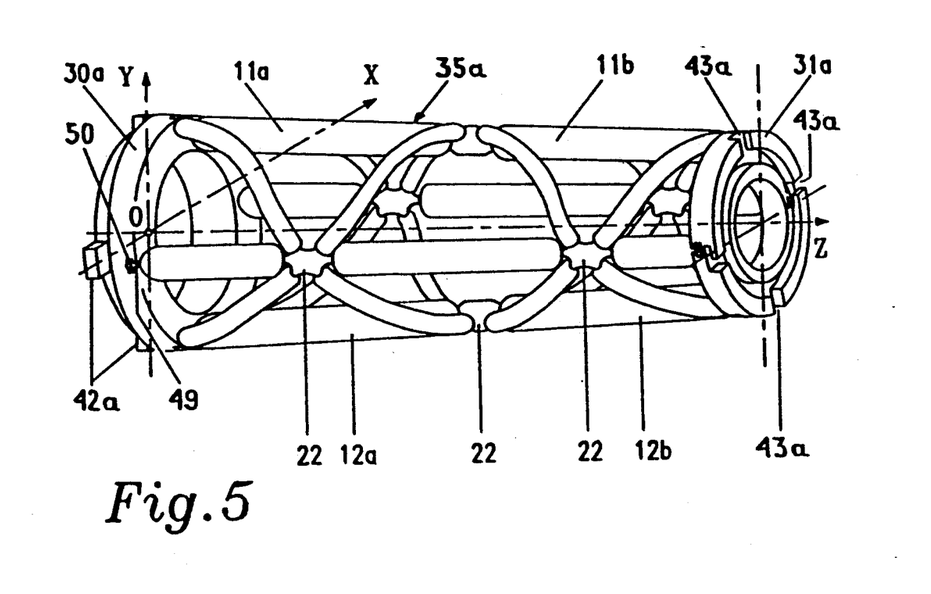
FIG. 5 is a perspective view of another flexible link actuating framework according to the invention, comprising fixed couplings at the intersections of all actuators.

The actuating framework 35 can be made as is shown in FIG. 2 or in FIG. 5. In the embodiment shown in FIG. 2, which is the most economical to manufacture, the actuating framework 35 comprises a pair of end plates 31, 30 attached to the distal and proximal ends of the spine 34, and four pairs of actuators, each actuator being essentially a circumferentially reinforced elastic tube which, when pressurized, expands axially and stores energy, and which, when released, tends to contract spontaneously and to do the work. Two of these four pairs of actuators are made of straight actuators 11, 12 and 13, 14 whose function is to develop bending moments in the planes OYZ and OXZ. The two other pairs of actuators are respectively made of helical actuators 15 and 17 positioned to create a positive torsion around the Z axis when contracting, and of other helical actuators 16 and 18 positioned to act in an antagonistic manner with respect to the actuators 15 and 17. By using a pair of left-hand helical actuators installed at 180° from each other, and a pair of the symmetrical right-hand actuators as disclosed hereinabove and shown in FIG. 2, one can obtain a pure torsion in each normal plane of the link, since the resulting normal load of such four helical actuators is always zero at any point along a flexible link. To achieve such a goal, the actuators 15 and 17 of the first pair of helical actuators have to be powered jointly through a single pressure supply tube 23R. Similarly the actuators 16 and 18 of the second pair have to be powered jointly through another pressure supply tube 23L.

The eight actuators forming the actuating framework 35 are anchored to the proximal and distal end plates 30 and 31 forming part of this framework.

Figure 3:
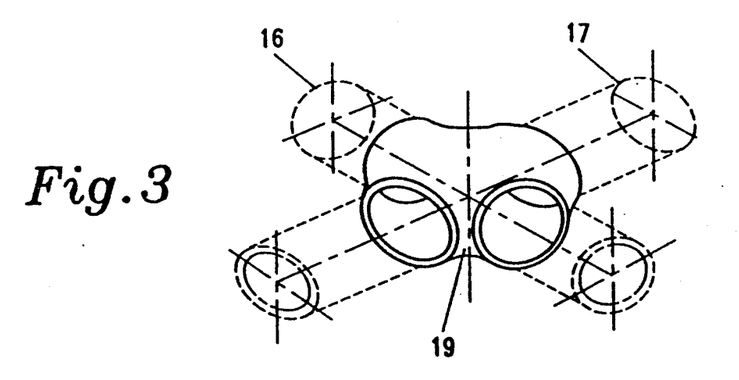
FIGS. 3 and 4 are views giving details of two types of actuator crossings that can be used in the framework shown on FIG. 2.
Figure 4:
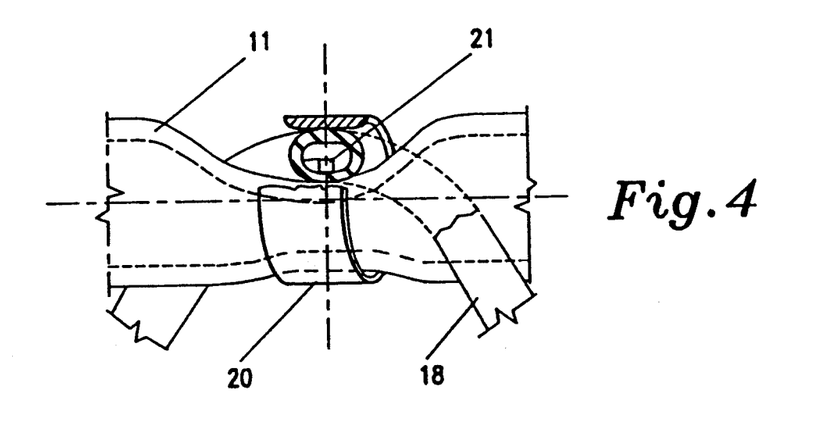

The straight and helical actuators are structurally connected in a partly flattened form at each of their crossings, by means of cross-shaped attachment 19 as shown in FIG. 3 or by means of rings 20 as shown in FIG. 4, whose purpose is to maintain the preassembled framework in an optimized configuration and the tubes partially flattened at crossings. A flexible, square plastic bar 21 as shown in FIG. 4, may be used to prevent chocking of the flow inside one of the actuators, say 18, when this one actuator is relaxed and the other actuator connected thereto, say 11, is under high pressure.

The flexible axially extensible and contractile actuators used herein, as well as all their mechanically relevant lifelike properties in an antagonistic configuration, may be of the same type as those described in U.S. Pat. No. 4,776,852 to the same inventor. More particularly, these actuators may consist of prestretched, circumferentially reinforced and axially extensible fluid power actuator tubes.

If the actuator that is used, is made from at least two circumferentially reinforced, separate tubes which fit one into another with certain air space, or spaces, between their walls, radial expansion of the innermost tube recruits progressively the outer tube or tubes into containment of the fluid working pressure. The increased working pressure simultaneously makes the air cushion between the actuator walls less and less compressible. This automatically increases the stiffness of an actuating pair as it operates against increasing external loads. This sequential radial recruitment of the actuator tubes, combined with the progressive hardening of compressed air cushion between them, may be used to provide a variable, lifelike relationship between the series element of the actuator and its actuating force.

Figures 6, 7:
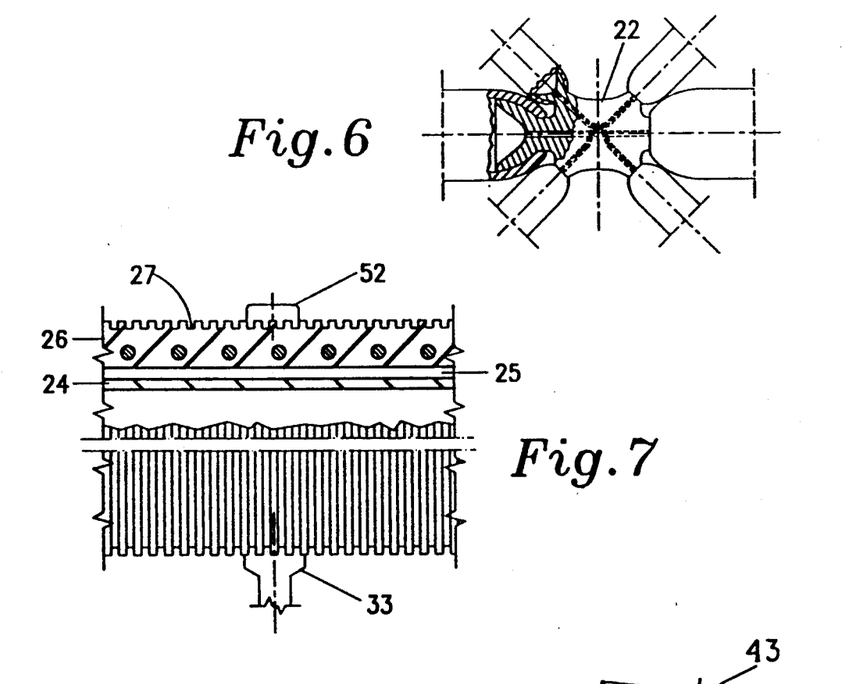
FIG. 6 is a top plan view partly in cross-section of the actuator intersection coupling used in the framework on FIG. 5.
FIG. 7 is a fragmentary longitudinal cross-sectional view of the wall of one of the actuators used in the frameworks of FIGS. 2 and 5, this wall being provided with an internal stiffness cell.

FIG. 7 illustrates a two tube wall actuator design as was just disclosed hereinabove. In this embodiment, the inner wall 24 and the outer wall 26 of the actuator form an air space 25 between them. The outer wall 26 is advantageously made with rectangular grooves 27 sized to match grooves provided for this purpose in the periphery of the vertebrae 33 and in external hoops 52, so that there is no axial slippage between the actuating framework 35 and the spinal column of each link.

In practice, the total number of actuator crossings as shown in FIGS. 3 and 4 may be substantially reduced, without changing the angle of the helical actuators, if use is made of triple intersection couplings 22 as illustrated in FIG. 5 and 6.

The actuating framework 35 as shown in FIG. 5 is conceptually identical to that of FIG. 2. However, the application of triple intersection couplings 22 reduces the overall number of intersection points from 22 to only 6 in a framework as the one numbered 35a, which is made from four straight bending actuators and four torsional actuators formed into 360° conical helices.

Since the framework of FIG. 5 has a larger number of actuator tubes, it has potential for greater economy only in a larger production of links with a substantial degree of automation at assembly. In other words, the framework 35 of FIG. 2 is more suitable for experimental and prototype work involving a predominantly manual assembly.

Besides a structural integration of the actuating network, the basic purpose of the crossing attachments 19 and 20 and intersection couplings 22 previously disclosed is to keep all the actuators at a maximum distance from the axial centerline of the link, for the greatest actuating moments and the best positioning accuracy.

As aforesaid, each flexible link according to the invention comprises a spine 34 made from elastic discs 32 and rigid vertebrae 33 alternately stacked to form a spinal column.

Figure 9:
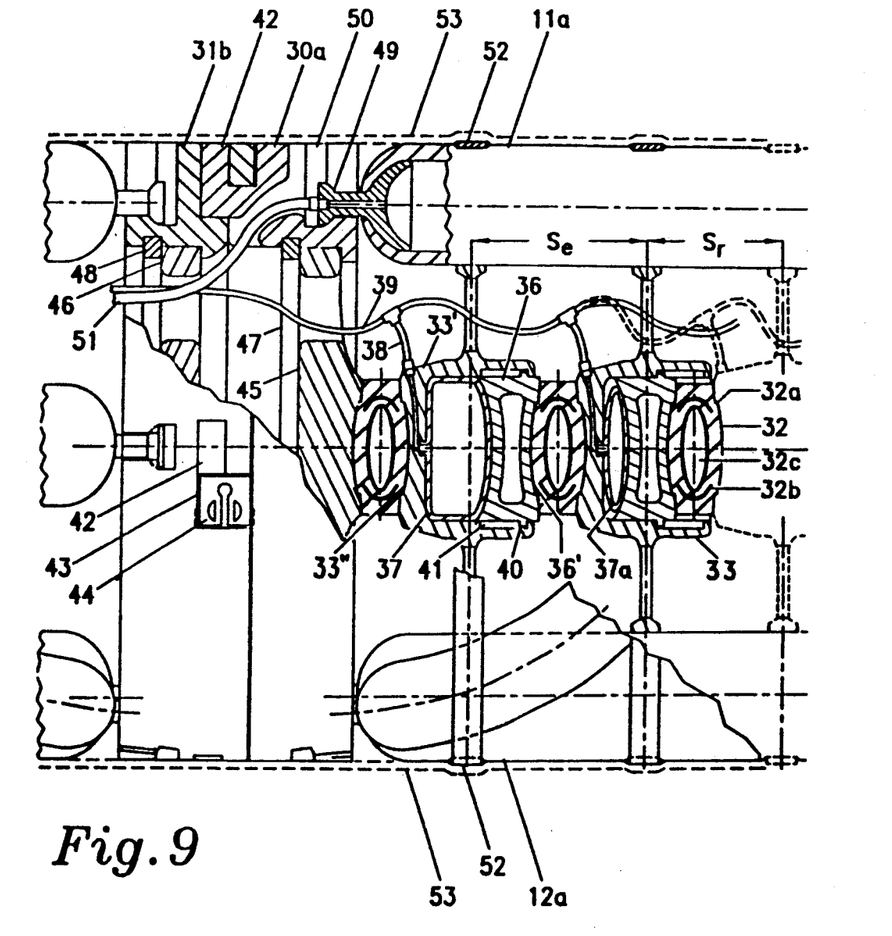
FIG. 9 is a longitudinal view, partly in cross-section, of a joint between two links, showing the way of attaching the actuators, and details of a retractible spinal column design.

The elastic discs 32 can be made of solid, reinforced elastomer. Alternatively, as is shown in FIG. 9, they can each be provided with an internal cavity 32c filled permanently with a high viscosity fluid. Such a fluid core in each disc 32 allows greater overall elastic deformation and adds a viscoelastic component to the mechanical response of the spine, similar to the soft, elastic, nucleus pulposus found in the center of a live intervertebral disc. Centering means in the form of recesses 32a and thin reinforcing semi-toric rings 32b can be provided onto the disks to improve the spinal resistance against shear loads.

Each artificial vertebrae 33 can be made of one piece molded from hard polymer as is shown in FIG. 8. Alternatively, each vertebrae 33 can be made of a plurality of components as is shown in FIG. 9, including a flanged housing 33' having, on one side, a seat 33" for an adjacent disk 32 and, opposite this one side an open cavity in which is mounted an inflatable chamber 37, and a hollow plug 36 sized to slide axially the plug having one end seating on the chamber 37 and another opposite external end shaped as a seat 36' to receive the other adjacent dics 32 retractible, within the housing 33'. When pressurized by a fluid, the inflatable chamber 37 inside the holding housing 33' of the vertebra 33 keeps the plug 36 in extended position. When the fluid is released toward an open tank via fluid tubes 38 and 39 provided for this purpose, the plug 36 retracts due to the axial compression generated by the prestretched and depressurized actuators. The shape of the deflated chamber 37 is shown as 37a on right of FIG. 9: it fits loosely inside the cavity when the plug 36 is in retracted position. The axial travel of the plug 36 is limited by mechanical stops that may consist of rectangular protrusions 40 free to move inside axial slots 41 provided in the internal wall of the hollow housing 33' of the vertebrae 33.

The purpose of using such a kind of retractible spine is to provide an automatic release of the actuating framework 35 which is usually axially prestressed when the flexible trunk is not in use. Conversely, the actuating framework 35 may be automatically re-prestretched as soon as the fluid power source is turned on. The intervertebral spacings in retracted and extended configurations are shown as $S_r$ and $S_e$, respectively, in FIG. 9.

Connection between the distal end plate 31b of one link and the proximal end plate 30a of an other adjacent link can be achieved with a twist-lock arrangement as shown in FIGS. 2, 5, 8 and 9, including teeth 42 radially projecting from one of the plate, say 30, and L-shaped recesses 43 made in the other plate, say 31, and so positioned as to receive the teeth 42. Accidental disconnection of these teeth from the recesses 43 in which they are engaged can be prevented with elastic, snap-action safety plugs 44 (see FIG. 9).

The end plates 30a and 31b have anchor cavities such as 50 sized to receive and retain actuator end plugs such as 49 (see FIGS. 5 and 9). The first and the last vertebrae of each link spine, numbered 45 and 46 respectively, can be attached to their adjacent end plates by means of a non-rotating connection including retaining rings 47 and 48 (see FIG. 9).

Figure 10:
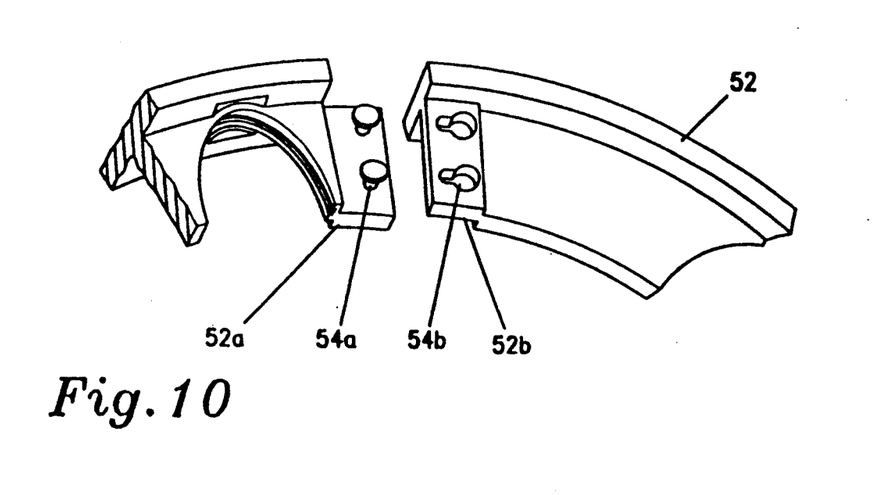
FIG. 10 is a perspective view of part of an actuating framework hoop joint.

As already mentioned hereinabove, the peripheral parts of the vertebrae 33 can be shaped to act as positioning spacers and thus hold in proper place all the actuators in the actuating framework 35. The hoops 52 already mentioned hereinabove provide structural integrity to the entire link assembly: they prevent separation of the straight actuators from the curved spine and they contribute to maintain proper spacing of all the actuators. Each hoop 52 can be detachably fixed as is shown in FIG. 10, using round-head studs 54a projecting from one end 52a of the hoop web in such a manner as to be engageable into slots 54b provided in the other end 52b of the web when this other end 52b overlaps the one end 52a.

Figures 11, 11A:
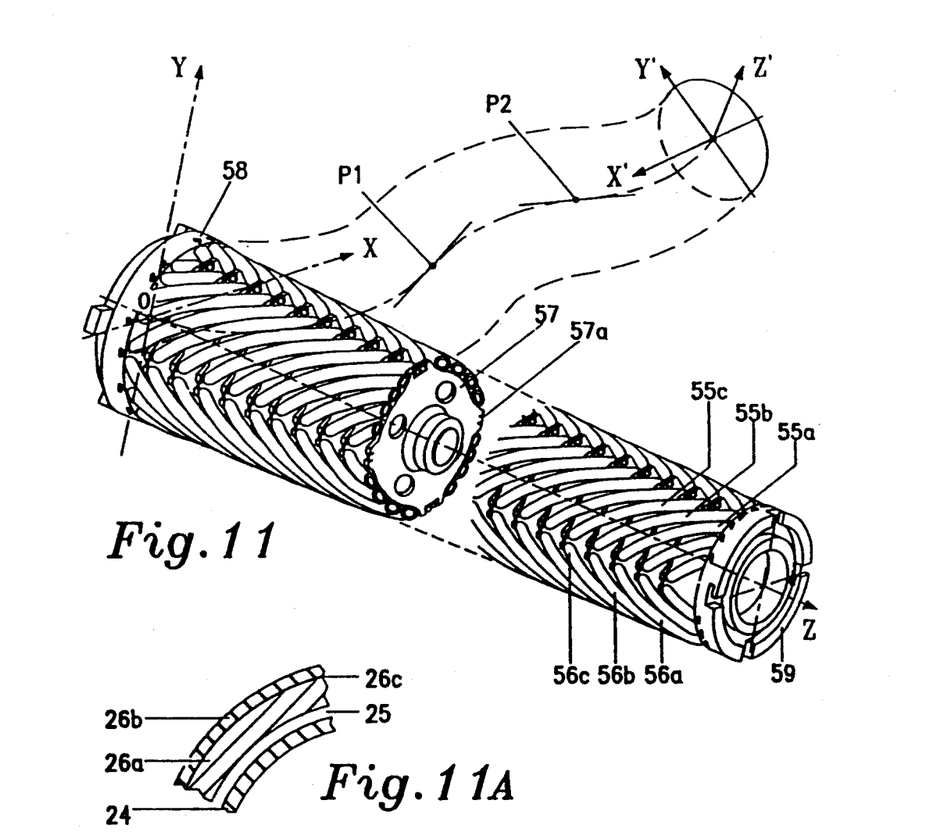
FIG. 11 is a pictorial perspective view of another flexible link according to the invention, provided with overlapping helical actuators.
FIG. 11A is a fragmentary cross-sectional view of a linear actuator tube.

A flexible link according to another preferred embodiment of the invention is shown in FIG. 11. The basic constructions of the actuators 55, 56, vertebrae 57, end plates 58, 59 and actuator anchors of this flexible link according to this other embodiment are conceptually similar to that of the previous embodiments. All of the flexible, axially extensible and contractile actuators 55, 56 of this embodiment are however divided into:

two groups of diametrically opposite, left-hand helical actuators, the two groups being axisymmetric with respect to the longitudinal axis of the spine and comprising axisymmetric pairs of actuators, each actuator having one end attached to one vertebra and another end attached to either another vertebra which is at least two discs away from the one vertebra, or to one of the end plates; and two other groups of similar, diametically opposite but right-hand helical actuators, the two other groups being also axisymmetric with respect to the longitudinal axis and forming an axisymmetric herringbone pattern with the two groups of left-hand helical actuators.

More particularly all of the actuators of this other embodiment are positioned at angle with respect to the longitudinal axis of the link and stretched in parallel relationship along the left-hand helices 55a, 55b, 55c, , , , on the one hand, and right-hand helices 56a, 56b, 56c, , , , on the other hand. This artificial musculature is symmetrical with respect to both OXZ and OYZ planes. All the contractile actuators 55, 56 are attached to pedicles 57a forming part of the vertebrae 57 or to the end plates 58 and 59 at the spine ends. Each of the actuators, such as 55a, 55b etc., span over several vertebrae and is usually confined, in the neutral configuration, to one quadrant of the reference coordinate frame XYZ to form altogether an axisymmetric herring-bone pattern.

With such an embodiment, each vertebrae 57 can be subjected to a positive or negative actuating moment around any axis when the actuators are individually controlled. The distribution pattern of such moments along the link is not predetermined as is the case in the previous embodiments. On the contrary, the link of the other embodiment can assume any desired curvature and torsion including shapes which require inflexion points such as, e.g., points P1 and P2. As a result, when use is made of such a flexible link design with such an arrangement of helical actuators, the number of links and joints of the robotic manipulator trunk is not governed any more by the number of required inflexion points. An entire flexible manipulator trunk may be made from one single link only. The greater number of actuators and added control complexity needed in such design make however this other embodiment justifiable only for stronger and more advanced machines requiring the highest degree of three-dimensional kinematic versatility. By way of example, any autonomous, interactive, mobile, artificial trunk capable of emulating a limbless reptilian type of locomotion, such as lateral undulation, concertina and sidewinding, will require this degree of kinematic versatility.

The helical actuators 55, 56 used in this other embodiment of the invention do not tend to separate from the spinal column and do not require any holding hoops. The possibility of a non-uniform control of the distribution of the torsion and curvature along the link may however result in different rates of axial strains in the actuators supported by the vertebral spacers and thus generate potential friction and wear between the actuators and the spacers. To eliminate such friction and wear, the main tube 26a of every actuator may be enclosed into a relatively softer and thinner artificial epimysium 26b as is shown in FIG. 11A. A permanently sealed lubricant on the contact surface 26c between 26a and 26b, allows the dry external actuator surface to remain fixed with respect to the intermediary vertebrae.

Figure 12:
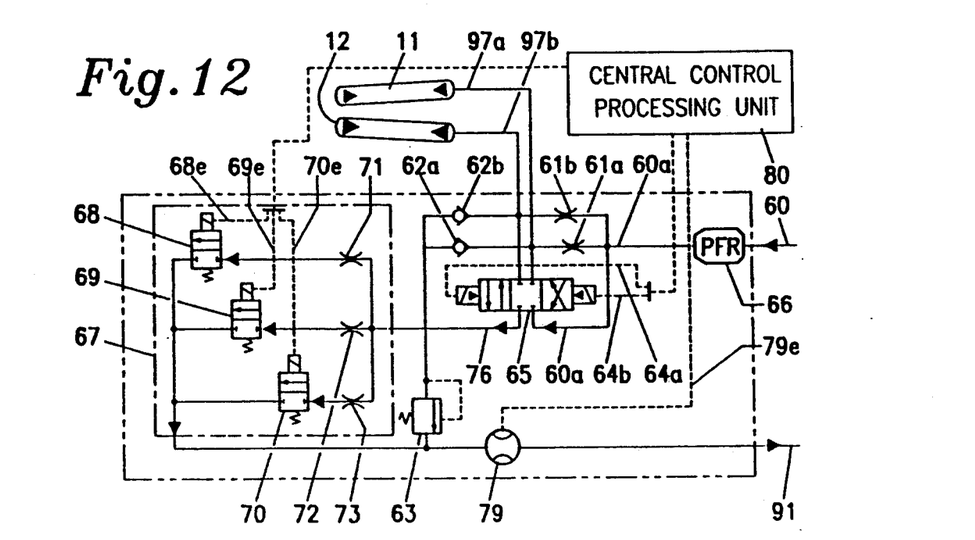
FIG. 12 is a schematic diagram of an asynchronous pulse stream control system for use in actuating a pair of actuators of a flexible link according to the invention.

FIG. 12 is a block diagram of an asynchronous variable force and velocity control system for use to actuate two antagonistic actuators of a flexible link according to the invention, as is shown for example in FIG. 2. At rest, the actuators 11 and 12 are both pressurized by lines 97a and 97b respectively connected to a constant pressure source 60 through a pressure-flow regulator 66. Flow restrictors 61a and 61b are mounted in the lines to prevent, under dynamic conditions, any significant direct in-flow of the operating fluid from the source 60. Should the external load create an excessive working pressure in the lines 97a and 97b, the fluid is automatically released by a relief valve 63 via check valves 62a and 62b. The relief valve 63 that can be common to all the actuators in the link, is connected to a fluid return line 91.

The positive and negative actuating moments of the actuators 11 and 12 are determined by energizing a 4-way valve 65 from a central control processing unit (CCPU) 80, via leads 64a and 64b. The magnitude of the actuating moment is varied by controlling the pressure of the contracting actuator opened to a line 76. This is done by an asynchronous pulse stream control subsystem (APSC) 67 which has a number of parallel valves, such as 68, 69 and 70, each in line with flow restrictors 71, 72 and 73 of different sizes. The valves 68, 69 and 70 are controlled by the CCPU 80 through control circuits 68e, 69e and 70e. The flow through the APSC 67 is adjusted by varying the number of active pulsating valves and by varying the frequencies and waveforms of the streams of valve control pulses. The resulting pressure control in the contracting actuator provides control of the actuating torque of the antagonistic pair of actuators 11 and 12. The actuating displacements, velocities and accelerations that are so generated can be evaluated by control algorithms from readings of a flowmeter 79 reported to the CCPU 80 via a lead 79e.

Figure 13:
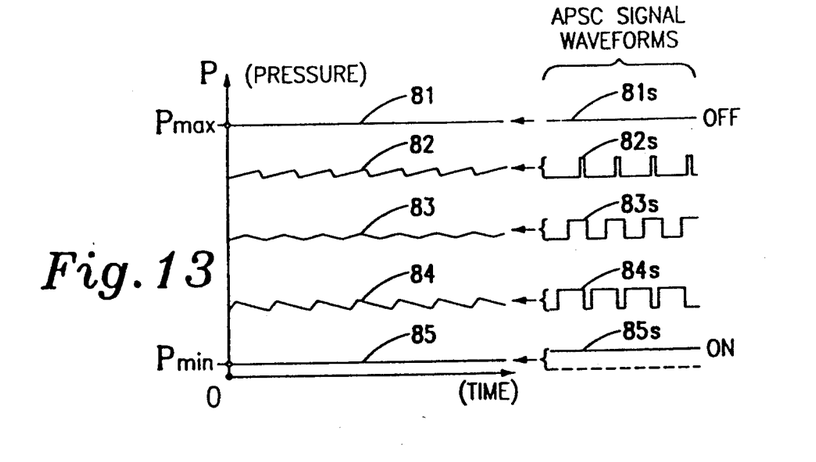
FIGS. 13 and 14 are graphs illustrating basic dynamic features of the control system shown on FIG. 12.

If, as is illustrated in FIG. 13, a valve of the APSC 67 is closed (control signal 81s is "off") in a given overall control configuration, such a closing maintains a maximum upstream pressure $P_{max}$ 81. If the same valve is energized intermittently by a stream of relatively short pulses, such as illustrated by the waveform 82s, the upstream pressure in the system will drop down to 82, averaging an operating pressure lower than $P_{max}$. As the pulses become relatively longer, e.g. 83s and 84s, the average pressures drop further as shown in the corresponding pressure/time graphs (see 83 and 84). A continuously open valve (control signal 85s is "on") maintains the lowest return pressure, $P_{min}$, under any given dynamic conditions.

In practise, a limited number of predetermined, mutually asynchronous, pulse stream waveforms may be generated continuously by the CCPU 80. The continuous sources of pulse streams can be tapped as required by a control scenario, and directed, simultaneously, to any number of valves of the APSC 67 assigned to every pair of actuators within the flexible trunk.

Due to the non-linearity of the flow-pressure relationship for a given orifice, one can find, for any common upstream pressure, that $$\ldots Q_{i,l}(Q_{j,k}) + Q_{j,k}(Q_{i,l}) \neq Q_{i,k}(Q_{j,l}) + Q_{j,l}(Q_{i,k}) \ldots$$

where i and j designate the i-th and j-th valves with different restrictors and 1 and k designate the 1-th and k-th pulse stream waveforms. The above expression can be expanded to any number of different valves and pulse streams, thereby providing a large number of flow control increments and corresponding force magnitudes with a relatively small number of valves and waveforms. For example, a set of only six asynchronous waveforms, plus a pair of continuous "on" and "off" control signals, can be combined by means of only three valves into 512 different force control settings in any dynamic activity. Similarly, fourteen asynchronous waveforms could yield 4096 force control increments. In this connection, it is worth noting that the above two-element force control is conceptually similar to the neuromuscular stimulation of a live muscle.

Figure 14:
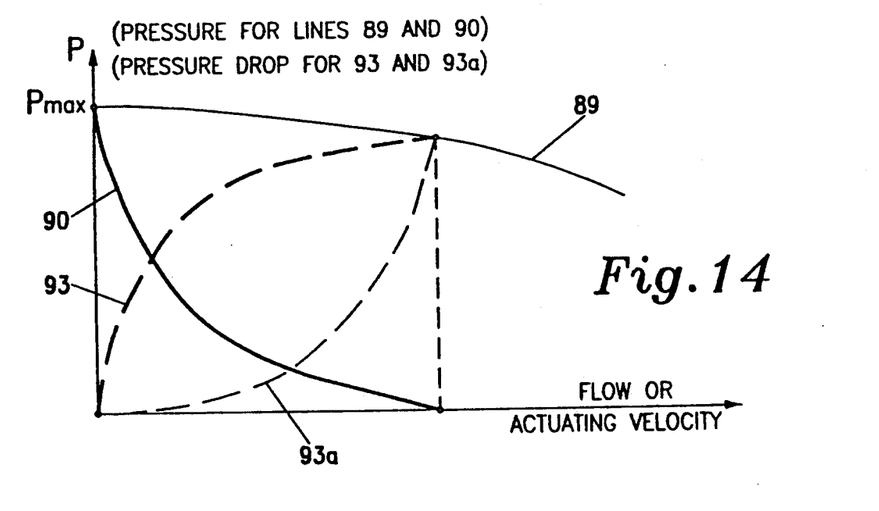

At any given constant working pressure, the force-velocity function of a hydraulic actuator can be represented by a parabola 89 as shown in FIG. 14. A live muscle however has a different force/contracting velocity function which, for any given constant degree of stimulation, can be fitted only with part of a rectangular hyperbola such as 90. To correct this behaviour discrepancy, a pressure/flow regulator 66 hereinafter called PFR, is used in the control system to convert the regular power actuating pressure/flow characteristic 89 into a biorobotic response 90. This is done by creating an in-line pressure drop which varies with the flow rate, i.e. with the fluid velocity, as represented by the dotted line 93 on FIG. 14. Without this non-linear PFR, a fixed orifice restrictor would generate a pressure drop/velocity response as given by the other dotted line 93a, which would not be compatible with the required response 90. As aforesaid, the PFR is numbered 66 in FIG. 12 and its internal structure is detailed in FIG. 15.

Figure 15:
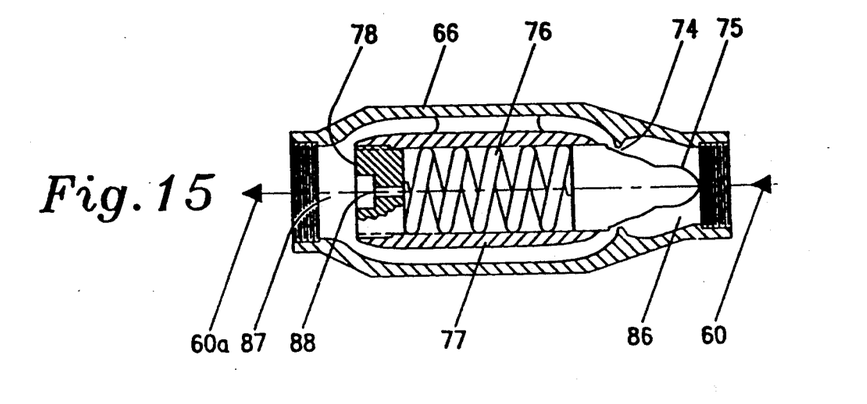
FIG. 15 is a cross-sectional view of an automatic pressure-flow regulator for use in the control system of FIG. 12.

As shown in this figure, the PFR 66 comprises a tubular body provided with an inlet 86 and an outlet 87. The inlet 86 acts as a shelter for a needle 75 slidably mounted into an axial housing 77 rigidly fixed in the middle of the PFR body. The needle 75 which is of a very specific shape as will be explained hereinafter, is normally biased toward the inlet 86 by means of a spring 76 held within the housing by a spring-retaining and take-up screw 78.

In use, any increase in flow inside the PFR body 66, increases the pressure drop between the inlet 86 and outlet 87 of this body and pushes downstream the PFR needle 75, thereby increasing the deflection of the spring 76 inside the spring housing 77. The downstream motion of the needle 75 increases the aperture 74 left between the tip of the needle and its seat and progressively increases the flow coefficient which is defined here as the ratio of the flow to the square root of the pressure drop. By suitably shaping the PFR needle 75, the variation of the flow coefficient obtained when the pressure drop increases, may be selected o obtain a pressure drop/flow response as shown with the dotted line 93 in FIG. 14. In practise, the PFRs maximum flow pressure drop will be selected so that, at the maximum expanding velocity, the rate of external energy output of an actuating pair drops to zero, in a straight link configuration.

As shown in FIG. 15, the spring retaining and take-up screw 78 has an orifice 88 to expose the spring side of the needle 75 to the lower pressure of the outlet 87. The orifice 88 is relatively small so that the fluid filled spring housing 77 can act as a vibration damper for the PFR needle 75.

Figure 16:
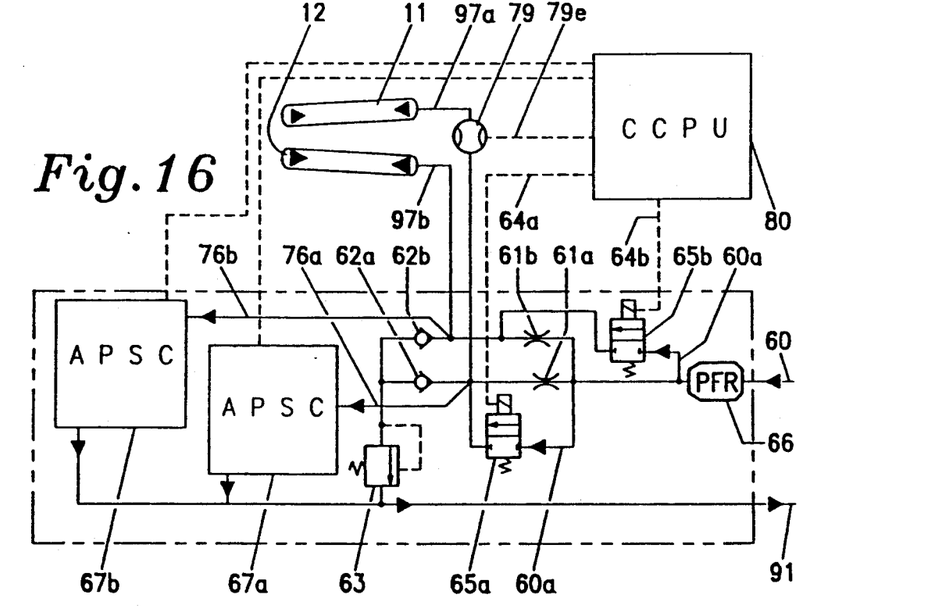
FIG. 16 is a schematic diagram of another flexible link control system which incorporates a link stiffness control feature.

The control system as shown in FIG. 12, always maintains the maximum possible link stiffness under all working conditions. For applications calling for an independent link stiffness control, an APSC subsystem as previously described can be used for each actuator, as is shown in FIG. 16 (see blocks 67a and 67b). The link stiffness, defined as the ratio of the incremental change of a supported external load to the corresponding link deformation, has to be at its maximum only when the link carries a maximum load. For any smaller load, the necessary difference between the working pressures inside the actuators 11 and 12 can be created by pressurizing the extending actuator below its maximum available working pressure in either an isometric or dynamic activity. Lower working pressures result in an increased volume of the air space 25 between the walls 24 and 26, as shown on FIG. 7, which leads to a reduced link stiffness.

In the control system shown in FIG. 16, the single four-way valve 65 used in the control system of FIG. 12 is replaced by two one-way valves 65a and 65b. The pressure relief valve 63, the PFR 66 and the flowmeter 79 used in this system have the same functions as in FIG. 12.

Figure 17:
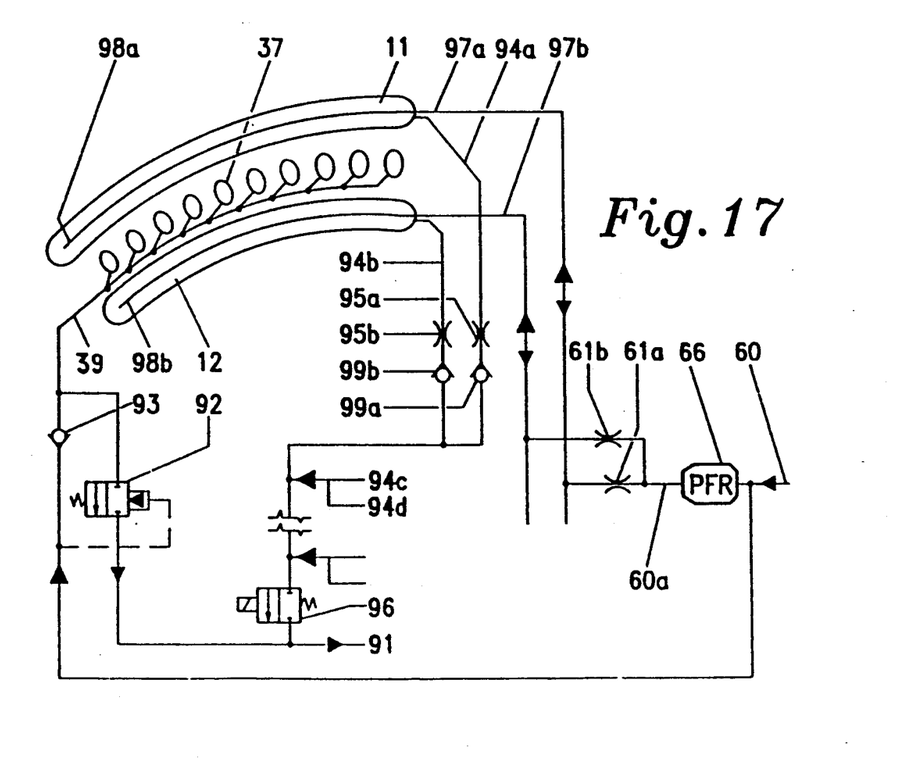
FIG. 17 is a schematic diagram and representation of an automatic control system for use in the extension and contraction of a link spinal column, incorporating optional means for providing internal heat exchange within the link fluid actuators.

In order to maintain flexibility and strength of the robotic link, one may have not only to protect the link with a thermal insulation, but also to heat or cool the same internally if it is exposed to unusually low or high temperatures while not being operated for an extended period of time. The control systems shown in FIG. 12 and 16 may be used to do so, provided that they are modified as is shown in FIG. 17. In this particular embodiment, fluid coming from the source 60 is heated or cooled with means known per se and then delivered to the far ends of the actuators 11 and 12 by means of flexible tubes 98a and 98b connected to the lines 97a and 97b, respectively.

Each actuator 11, 12 is provided with fluid outlet line 94a, 94b opposite its far end, which outlet line leads to a temperature regulating valve 96. When the valve 96 is open, the fluid flows continuously inside the actuators 11 and 12 from the ends of the tubes 98a and 98b towards the outlet lines 94a and 94b. Restrictors 95a and 95b considerably smaller than those numbered 61a and 61b, minimize the pressure drop inside the actuators. During dynamic activities, the temperature regulation valve 96 is closed by the CCPU 80 and check valves 99a and 99b mounted in the lines 94a and 94b prevent any exchange of fluid between the actuators. The valve 96 can be common to all the actuators of an entire flexible trunk (see, for example, lines 94c, 94d, etc. . . . ).

When a retractible artificial spine as shown in FIG. 9 is used, the inflatable chambers 37 of the vertebrae 33 are pressurized with fluid supplied from the source 60 via the fluid tube 39, thereby keeping the spine and thus the link in fully extended position (see FIG. 17). When the fluid pressure source 60 is turned off, an one-way, pilot, pressure-operated, spring return valve 92, is opened and allows the fluid to escape through the fluid return line 91. This in turn causes the spine to retract, thereby allowing the actuators to unstretch. A check valve 93 can be provided to allow the pressure in the chambers 37 to exceed the maximum pressure generated by the fluid pressure source 60. This feature is important to prevent the spontaneous contraction of depressurized actuators and/or action of some external link loads, from unduly shortening the spine while the pressure source 60 is turned on.

What is claimed:

1. A flexible robotic link comprising:
   an artificial spine having a longitudinal axis, a proximal end and a distal end, said spine being capable of being laterally bent through elastic deformation and twisted about its longitudinal axis through elastic torsional deformation;
   end plates attached to said proximal and distal ends of said spine, respectively; and
   a set of axially extensible and contractible actuators connected to said spine and said end plates in such a manner as to bend and twist said spine in any direction when properly actuated.

2. A link as claimed in claim 1,
   wherein said set of actuators comprises:
   at least three longitudinal actuators extending parallel to said longitudinal axis of said spine, said longitudinal actuators being actuable independently or in any combined manner to bend the spine in any direction; and
   at least two pairs of diametrically opposite, antagonistic actuators, each of said pairs comprising at least one left-hand helical actuator and at least one right-hand helical actuator, said helical actuators of said pairs being capable of being operated independently or in any combined manner to twist the spine in either direction;
   wherein each of said actuators of said set consists of a prestretched, circumferentially reinforced and axially extensible, tubular, fluid power actuator; and
   wherein said actuators are assembled to form an actuating framework, said framework including means for attaching said actuators together at every intersection thereof and hoops surrounding all of said actuators.

3. A link as claimed in claim 2,
   wherein said set of actuators comprises four longitudinal actuators and two pairs of diametrically opposite, antagonistic left-hand and right-hand helical actuators, each of said actuators comprising an elastic tube;
   wherein the left-hand and right-hand helical actuators are positioned so as to intersect with each other and with one of said longitudinal actuators at common intersection points; and
   wherein said attaching means comprise couplings located at said intersection points for joining six of said actuators together, each of said couplings having three separate. internal channels for inter-connecting three corresponding pairs of elastic actuator tubes.

4. A link as claimed in claim 2, wherein each of said hoops comprises:
   a web having a pair of opposite ends and a T-shaped cross section with cutouts to fit around said actuators and serve as actuator spacers;
   fixation means for detachably fixing said web ends in overlapping position, said fixation means including round head studs in one of said web ends and slotted holes in the other of said ends; and
   rectangular grooves on all surfaces of said web which are in contact with the longitudinal actuators, said rectangular grooves being sized to match circumferential grooves externally provided on said longitudinal actuators.

5. A link as claimed in claim 3, wherein each of said hoops comprises:
   a web having a pair of opposite ends and a T-shaped cross section with cutouts to fit around said actuators and serve as actuator spacers;
   fixation means for detachably fixing said web ends in overlapping position, said fixation means including round head studs in one of said web ends and slotted holes in the other of said ends; and
   rectangular grooves on all surfaces of said web which are in contact with the longitudinal actuators, said rectangular grooves being sized to match circumferential grooves externally provided on said longitudinal actuators.

6. A link as claimed in claim 1,
   wherein said spine is made from artificial vertebrae and disks alternately stacked to form a column; and
   wherein said set of actuators comprises:
   two groups of diametrically opposite, left-hand helical actuators, said two groups being axisymmetric with respect to said longitudinal axis of said spine and comprising axisymmetric pair of actuators each having one end attached to one vertebra and another end attached to either another vertebra which is at least two discs away from said one vertebra, or to one of said end plates;
   two other groups of similar, diametically opposite but right-hand helical actuators, said two other groups being also axisymmetric with respect to said longitudinal axis and forming an axisymmetric herringbone pattern with said two groups of left-hand helical actuators.

7. A link as claimed in claim 6, wherein each of said actuators is prelubricated and sealed inside a relatively softer and thinner elastic tubular sheath.

8. A link as claimed in claim 2, wherein each of said actuators comprises:
   an outer, circumferentially reinforced elastic tube;
   at least one inner, elastic tube; and
   at least one sealed air space between said inner and outer tubes.

9. A link as claimed in claim 3, wherein each of said actuators comprises:
   an outer, circumferentially reinforced elastic tube;
   at least one inner, elastic tube; and
   at least one sealed air space between said inner and outer tubes.

10. A link as claimed in claim 5, wherein each of said actuators comprises:
an outer, circumferentially reinforced elastic tube;
at least one inner, elastic tube; and
at least one sealed air space between said inner and outer tubes.

11. A link as claimed in claim 1, wherein said spine is made from rigid artificial vertebrae and elastic discs alternately stacked and firmly bonded to each other.

12. A link as claimed in claim 11, wherein some of said actuators are externally provided with rectangular circumferential grooves to make them non sliding with respect to the artificial spine.

13. A link as claimed in claim 12, wherein said artificial vertebrae have flanges shaped to serve as actuator spacers and wherein said flanges have rectangular grooves on all surfaces thereof in contact with the actuators, said rectangular grooves being sized to match those on the actuators.

14. A link as claimed in claim 11, wherein the said vertebrae and disks are provided with means for automatically centering them when they are assembled, and for allowing direct transmission of spinal shear stresses.

15. A link as claimed in claim 11, wherein said elastic discs are made with a central cavity filled with a high viscosity fluid.

16. A link as claimed in claim 14, wherein each of said discs has an elastomeric body embedding thin, semitoric reinforcing rings allowing flexion of the spine while reducing deformation by shear.

17. A link as claimed in claim 11, wherein each of said artificial vertebrae is made from at least two components which can move axially with respect to each other, said components including:
a flanged housing having, on one side, a seat for an adjacent disc and opposite said one side, an open cavity in which is mounted an inflatable chamber; and
a plug sized to slide axially inside said cavity of said flanged housing, said plug having one end seated on said inflatable chamber, and another end shaped as a seat for another adjacent disc,
said elastic inflatable chamber, when inflated, keeping said plug in fully extended position.

18. A link as claimed in claim 11, wherein said inflatable chamber is operatively connected to a control circuit comprising:
a direct high pressure fluid line leading to each chamber, said line having a check valve;
a depressurizing by-pass; and
a pilot-controlled valve mounted in said by-pass, said valve automatically opening as soon as the fluid pressure is turned off.

19. A link as claimed in claim 1, wherein said actuators have inverted hemispherical heads at both ends and are anchored to said end plates or to flanges radially extending from said spine by insertion of said heads into corresponding T-shaped cavities with hemispherical seats, provided in said end plates or flanges, said heads being maintained within said cavities by constant tension of said actuators.

20. A link as claimed in claim 11, wherein said spine comprises a first vertebrae and a last vertebrae each having a polygonal flange fitted into one of the end plates and held in place by an elastic retaining ring.

21. A link as claimed in claim 1, wherein one of said end plates is provided with a coupling suitable for mounting said link onto either a stationary support structure or onto another link provided with a matching coupling, and wherein the other end plate is provided with at least one other coupling for receiving and connecting at least one distal link.

22. A link as claimed in claim 21, wherein said couplings are of the twist-lock type and include teeth on one of said end plates, sized and positioned to engage matching recesses on a mating end plate, both of said end plates being secured from accidental disconnection after coupling by means of elastic, snap-action safety plugs.

23. A link as claimed in claim 2, wherein said actuators are supplied with a flow of fluid under pressure and wherein said fluid pressure is varied as a function of the flow rate by means of a pressure-flow regulator comprising:
a regulator body having an internal flow restriction aperture;
a spring-loaded throttling needle extending within said aperture and shaped to increase said flow aperture as the flow rate increases;
said needle being slidably mounted within a fluid-filled needle spring housing provided with a spring tension take-up screw and with a small throttling needle vibration damper orifice.

24. A link as claimed in claim 3, wherein said actuators are supplied with a flow of fluid under pressure and wherein said fluid pressure is varied as a function of the flow rate by means of a pressure-flow regulator comprising:
a regulator body having an internal flow restriction aperture;
a spring-loaded throttling needle extending within said aperture and shaped to increase said flow aperture as the flow rate increases;
said needle being slidably- mounted within a fluid-filled needle spring housing provided with a spring tension take-up screw and with a small throttling needle vibration damper orifice.

25. A link as claimed in claim 6, wherein said actuators are supplied with a flow of fluid under pressure and wherein said fluid pressure is varied as a function of the flow rate by means of a pressure-flow regulator comprising:
a regulator body having an internal flow restriction aperture;
a spring-loaded throttling- needle extending within said aperture and shaped to increase said flow aperture as the flow rate increases;
said needle being slidably mounted within a fluid-filled needle spring housing provided with a spring tension take-up screw and with a small throttling needle vibration damper orifice.

26. A link as claimed in claim 2, comprising means for regulating the isometric pressure or rate of contraction of every actuator of each actuating pair of actuators, said regulating means including at least two pulsating return valves energized intermittently by means of mutually asynchronous pulse streams, said return valves operating within a control circuit which comprises:
a fixed fluid supply restrictor for each said actuator;
a four-way valve for directional control of each actuating pair;
a common pressure relief valve; and
a remote reading, in-line flowmeter.

27. A link as claimed in claim 3, comprising means for regulating the isometric pressure or rate of contraction of every actuator of each actuating pair of actuators, said regulating means including at least two pulsating return valves energized intermittently by means of mutually asynchronous pulse streams, said return valves operating within a control circuit which comprises:
- a fixed fluid supply restrictor for each said actuator;
- a four-way valve for directional control of each actuating pair;
- a common pressure relief valve; and
- a remote reading, in-line flowmeter.

28. A link as claimed in claim 6, comprising means for regulating the isometric pressure or rate of contraction of every actuator of each actuating pair of actuators, said regulating means including at least two pulsating return valves energized intermittently by means of mutually asynchronous pulse streams, said return valves operating within a control circuit which comprises:
- a fixed fluid supply restrictor for each said actuator;
- a four-way valve for directional control of each actuating pair;
- a common pressure relief valve; and
- a remote reading, in-line flowmeter.

29. A link as claimed in claim 2, comprising means for controlling both the stiffness and torque of each actuating pair of actuators, said controlling means comprising two sets of at least two pulsating return valves energized intermittently by means of mutually asynchronous pulse streams, said valve sets separately regulating the pressure of each actuator and operating within a control circuit which comprises:
- a fixed fluid supply restrictor for each of said actuators;
- a one-way unrestricted fluid supply valve for each of said actuators;
- a common pressure relief valve; and
- a remote reading in-line flowmeter.

30. A link as claimed in claim 3, comprising means for controlling both the stiffness and torque of each actuating pair of actuators, said controlling means comprising two sets of at least two pulsating return valves energized intermittently by means of mutually asynchronous pulse streams, said valve sets separately regulating the pressure of each actuator and operating within a control circuit which comprises:
- a fixed fluid supply restrictor for each of said actuators;
- a one-way unrestricted fluid supply valve for each of said actuators;
- a common pressure relief valve; and
- a remote reading in-line flowmeter.

31. A link as claimed in claim 6, comprising means for controlling both the stiffness and torque of each actuating pair of actuators, said controlling means comprising two sets of at least two pulsating return valves energized intermittently by means of mutually asynchronous pulse streams, said valve sets separately regulating the pressure of each actuator and operating within a control circuit which comprises:
- a fixed fluid supply restrictor for each of said actuators;
- a one-way unrestricted fluid supply valve for each of said actuators;
- a common pressure relief valve; and
- a remote reading in-line flowmeter.

32. A link as claimed in claim 2, comprising means for heating or cooling the actuators by means of a continuous circulation of the fluid at controlled temperature within a circuit which comprises:
- an extended internal fluid supply line on each actuator;
- a return line with a restrictor and a check valve on each actuator; and
- a common, one-way return valve for use to start and stop said fluid circulation in all said actuators.

33. A link as claimed in claim 3, comprising means for heating or cooling the actuators by means of a continuous circulation of the fluid at controlled temperature within a circuit which comprises:
- an extended internal fluid supply line on each actuator;
- a return line with a restrictor and a check valve on each actuator; and
- a common, one-way return valve for use to start and stop said fluid circulation in all said actuators.

34. A link as claimed in claim 6, comprising means for heating or cooling the actuators by means of a continuous circulation of the fluid at controlled temperature within a circuit which comprises:
- an extended internal fluid supply line on each actuator;
- a return line with a restrictor and a check valve on each actuator; and
- a common, one-way return valve for use to start and stop said fluid circulation in all said actuators.

35. A link as claimed in claim 1, wherein each of the actuators is laterally bendable through elastic deformation to follow any bending or twisting motion of said spine.

36. A link as claimed in claim 2, wherein each of the actuators is laterally bendable through elastic deformation to follow any bending or twisting motion of said spine.

37. A link as claimed in claim 3, wherein each of the actuators is laterally bendable through elastic deformation to follow any bending or twisting motion of said spine.

38. A link as claimed in claim 6, wherein each of the actuators is laterally bendable through elastic deformation to follow any bending or twisting motion of said spine.

* * * * *